United States Patent [19]

Ando

[11] Patent Number: 5,421,786
[45] Date of Patent: Jun. 6, 1995

[54] REAR DERAILLEUR BRACKET

[75] Inventor: Yoshiaki Ando, Sakai, Japan

[73] Assignee: Shimano Inc., Osaka, Japan

[21] Appl. No.: 188,767

[22] Filed: Jan. 31, 1994

[30] Foreign Application Priority Data

Feb. 3, 1993 [JP] Japan .................. 5-002389 U

[51] Int. Cl.⁶ .............................................. F16H 7/18
[52] U.S. Cl. .......................................... 474/78; 474/80
[58] Field of Search ........................... 474/78-82

[56] References Cited

U.S. PATENT DOCUMENTS

| 4,599,079 | 7/1986 | Chappell . | |
|---|---|---|---|
| 4,610,644 | 9/1986 | Nagano . | |
| 4,612,004 | 9/1986 | Nagano | 474/80 |
| 4,637,808 | 1/1987 | Nakamura . | |
| 4,690,663 | 9/1987 | Nagano . | |
| 5,082,303 | 1/1992 | Duehring et al. . | |

FOREIGN PATENT DOCUMENTS

| 61365 | 9/1982 | European Pat. Off. . |
|---|---|---|
| 75927 | 4/1983 | European Pat. Off. . |
| 2551418 | 3/1985 | France . |
| 2574144 | 6/1986 | France . |
| 47-27656 | 7/1972 | Japan . |
| 52-60059 | 5/1977 | Japan . |
| 62-10874 | 3/1987 | Japan . |
| 55-66894 | 5/1990 | Japan . |

OTHER PUBLICATIONS

Patent Abstracts of Japan, vol. 17, No. 580(M-1500) 21 Oct. 1993(JP-A-05 170 168).
Ser. No. 08/188,768.

Primary Examiner—Michael Powell Buiz
Attorney, Agent, or Firm—Dickstein, Shapiro & Morin

[57] ABSTRACT

A rear derailleur bracket for connecting a rear derailleur to a bicycle frame, utilizing a coupling device formed on a derailleur mounting extension of a rear fork end of the bicycle frame. The rear derailleur bracket includes a bracket body, a first bolt bore provided adjacent one end of the bracket body for connecting the rear derailleur to the bracket body, a second bolt bore provided adjacent the other end of the bracket body for connecting the bracket body to the coupling device of the bicycle frame, and a projection acting as a position setting device for contacting the derailleur mounting extension to place the rear derailleur in a predetermined posture relative to the rear fork end. The projection extends substantially vertically from a surface of the bracket body.

3 Claims, 3 Drawing Sheets

REAR DERAILLEUR BRACKET

BACKGROUND OF THE INVENTION

1. Field of the Invention

The present invention relates to a rear derailleur bracket for connecting a rear derailleur to a bicycle frame, utilizing a coupling portion formed on a derailleur mounting extension of a rear fork end of the bicycle frame.

2. Description of the Related Art

Conventionally, where a bicycle has a frame including a derailleur mounting extension of a rear fork end, a rear derailleur bracket is directly connected to a coupling portion, such as a cutout portion, formed on the derailleur mounting extension. A rear derailleur is attached to the bicycle frame through the rear derailleur bracket.

It was around 1952 when the first example of bicycle frame structure appeared in which a rear derailleur was attached directly to the derailleur mounting extension of the rear fork end. From that time to this day, where the bicycle frame includes the derailleur mounting extension, the derailleur, regardless of its specifications, has been regarded as being designed for direct connection to the derailleur mounting extension. This direct connection of the rear derailleur has continued as an established practice.

Certain types of rear derailleurs directly connected to the rear fork end heretofore are not well suited to the bicycle frame configuration. This fails to attain an optimal state of attachment, resulting in a poor shifting performance. When the rear derailleur is attached, its guide wheel is located relatively far apart in a forward direction of the bicycle from rear gears. To change the chain from one gear to another, the guide wheel moves to a lateral position relatively remote from the gears. Such a shifting operation of the rear derailleur does not achieve high efficiency in disengaging and engaging the chain. Thus, the rear derailleur has a reduced shifting operability.

SUMMARY OF THE INVENTION

An object of the present invention is to provide a technique of attaching a rear derailleur to a bicycle frame having a derailleur mounting extension defining a coupling portion in a way to assure excellent chain relocating characteristics and high shifting efficiency, regardless of specifications of the rear derailleur.

The above object is fulfilled, according to the present invention, by a rear derailleur bracket comprising a bracket body; first connecting means provided adjacent one end of the bracket body for connecting the rear derailleur to the bracket body; second connecting means provided adjacent the other end of the bracket body for connecting the bracket body to the coupling device of the bicycle frame; and position setting means for contacting the derailleur mounting extension to place the rear derailleur in a predetermined posture relative to the rear fork end.

Where the derailleur has varied specifications such as a varied shape and operating characteristics, the derailleur has a varied suitable assembled posture relative to the bicycle frame for performing an excellent shifting performance such as by an efficient application to the chain of a chain relocating force. Taking this aspect into account, the present invention provides a bracket which, when connected to the derailleur mounting extension, presents a suitable connecting position to the derailleur to be assembled to the bicycle frame. Consequently, the derailleur connected to this bracket may assume a suitable assembled posture with ease.

Moreover, the bracket is attached to the bicycle frame in a predetermined posture readily assured by action of the position setting means.

Some rear derailleurs may have such configurations that, when directly connected to the derailleur mounting extension of the rear fork end, fail to assume a suitable assembled posture, thereby exhibiting a poor shifting performance. However, by using the bracket according to the present invention, such derailleurs may also assume a suitable assembled posture to have an enhanced shifting performance.

The position setting means allows the bracket to be placed in the above predetermined posture with ease, which facilitates an assembling operation from the point of view of bracket posture setting.

To facilitate manufacture of this bracket, in a preferred embodiment of the present invention, the bracket body is formed of an approximately L-shaped plate, with the first connecting means and the second connecting means being in form of substantially circular belt bores. The position setting means, which determines a connecting position of the second connecting means, i.e. a bolt bore, may advantageously be disposed adjacent the second connecting means.

Preferably, the position setting means is in form of a projection extending substantially vertically from a surface of the plate forming the bracket body.

Other features and advantages of the invention will be apparent from the following description of the preferred embodiment taken in conjunction with the accompanying drawings.

DETAILED DESCRIPTION OF THE PREFERRED EMBODIMENT

Figure 1:
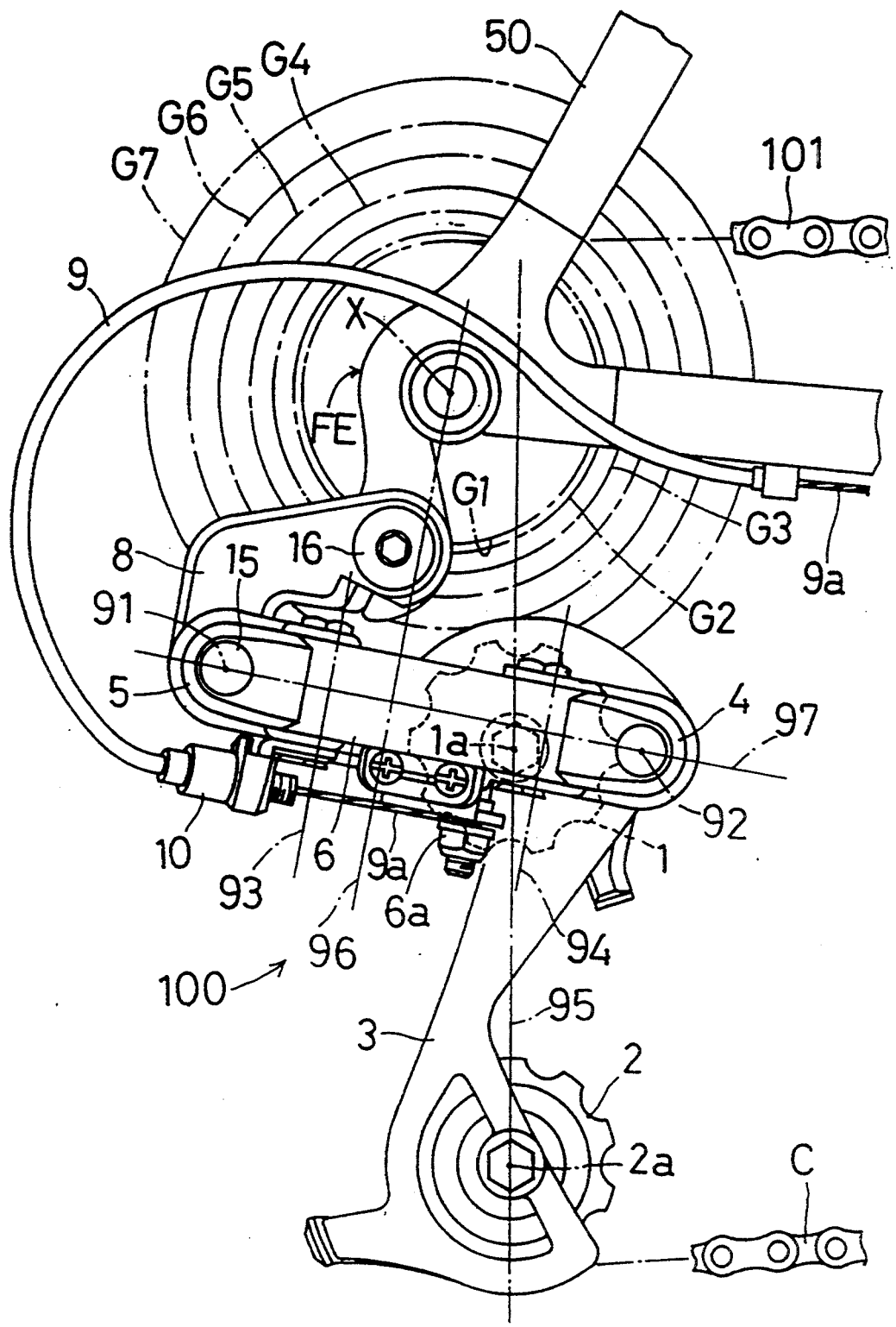
FIG. 1 is a side view of a rear derailleur attached to a bicycle through a rear derailleur bracket according to the present invention.

FIG. 1 shows a rear shifting device of a bicycle for providing seven speeds. As shown, a bicycle frame 50 includes a rear wheel hub having seven rear gears G1-G7 of different diameters. A rear derailleur 100 is attached to the bicycle frame 50 through a bracket 8. The rear derailleur 100 includes a chain guide 3 having a guide wheel 1 and a tension wheel 2, a support member 4 for supporting the chain guide 3, a bracket member 5, and a pair of right and left pivot links 6 and 7 for interconnecting the support member 4 and bracket member 5.

Figure 2:
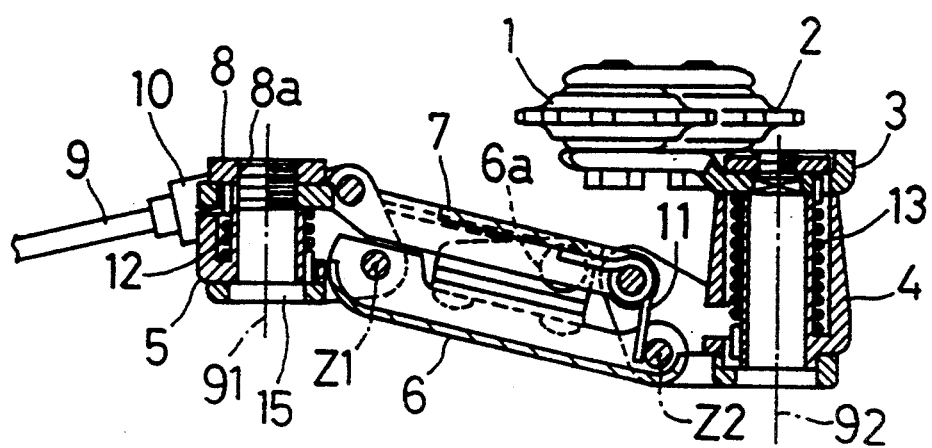
FIG. 2 is a sectional view of the rear derailleur attached to the bicycle through the rear derailleur bracket according to the present invention.

A control cable 9 extending from a shift controller (not shown) is connected to an outer tube clamp 10 attached to the bracket member 5, and to an inner wire clamp 6a attached to one of the pivot links 6. When the shift controller pulls an inner wire 9a, the inner wire 9a causes the pivot links 6 and 7 to pivot inwardly of the bicycle frame relative to the bracket member 5. At this time, the support member 4 moves also inwardly, whereby the guide wheel 1 changes a chain 101 from a smaller one to a larger one of the rear gears G1–G7. Conversely, when the shift controller relaxes the inner wire 9a, the pivot links 6 and 7 pivot outwardly of the bicycle frame under the force of a return spring 11 as shown in FIG. 2. At the same time, the support member 4 moves also outwardly, whereby the guide wheel 1 changes the chain 101 from a larger one to a smaller one of the rear gears G1–G7.

The bracket member 5 is connected to the bracket 8 to be pivotable about a first axis 91. Thus, the support member 4 is vertically pivotable about the first axis 91 relative to the bicycle frame 50. A first tension spring 12 mounted in the bracket member 5 as shown in FIG. 2 biases the bracket member 5 to pivot about the first axis 91 relative to the bracket 8. Thus, the support member 4 is biased to pivot about the first axis 91, to apply a tension to the chain 101 through the guide wheel 1 and tension wheel 2. The chain guide 3 is connected to the support member 4 to be pivotable about a second axis 92. Thus, the guide wheel 1 and tension wheel 2 are pivotable relative to the support member 4 about the second axis 92. A second tension spring 13 mounted in the support member 4 as shown in FIG. 2 biases the chain guide 3 to pivot relative to the support member 4. Thus, the guide wheel 1 and tension wheel 2 are biased to pivot relative to the support member 4, to apply a tension to the chain 101. With this construction, when the guide wheel 1 moves sideways relative to the bicycle frame to change the chain from one gear to another, the support member 4 pivots vertically about the first axis 91, and a portion of the chain guide 3 supporting the guide wheel 1 pivots vertically about the second axis 92. As a result, the guide wheel 1 moves sideways as well as vertically to a close vicinity of the gears G1–G7 to shift the chain 101 efficiently. The chain 101 is maintained in a predetermined tension whichever of the gears G1–G7 is engaged by the chain 101.

Figure 3:
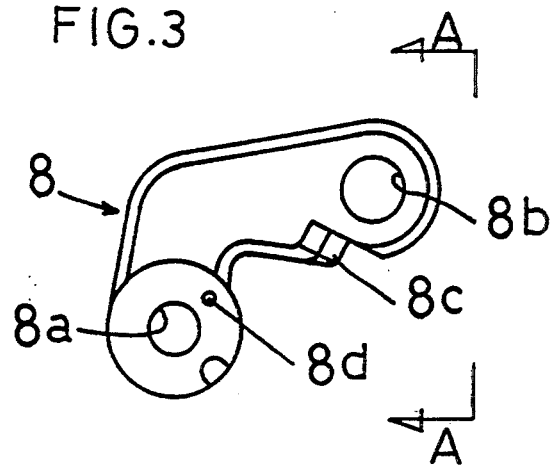
FIG. 3 is a front view of the rear derailleur bracket according to the present invention.
Figure 4:
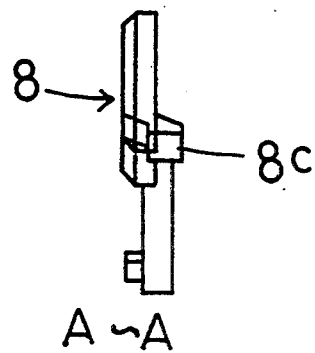
FIG. 4 is a side view of the rear derailleur bracket seen from a direction of A—A in FIG. 3.
Figure 5:
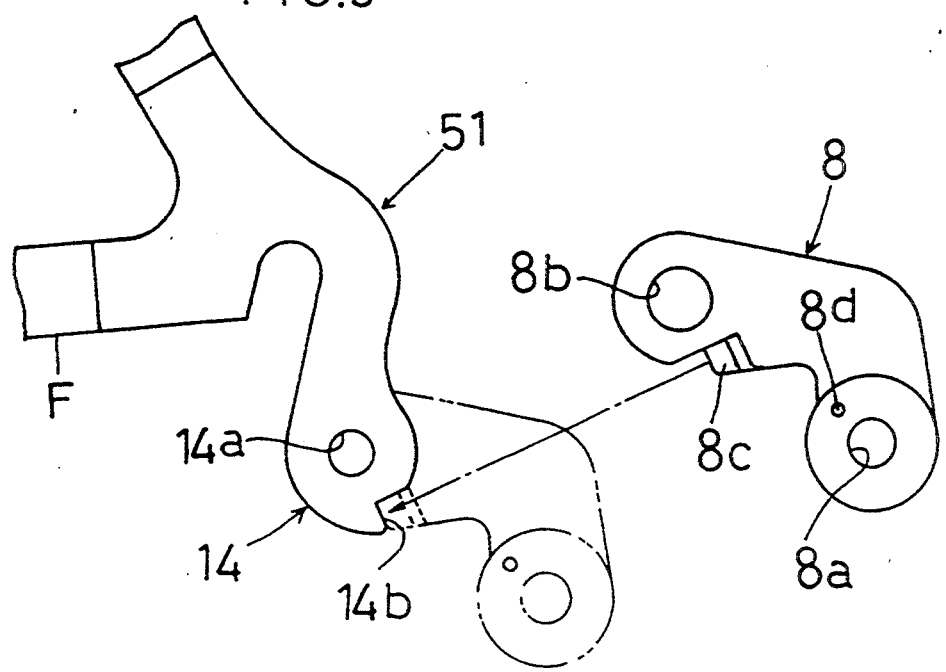
FIG. 5 is an explanatory view showing a way in which the rear derailleur bracket is connected to a bicycle frame.

As shown in FIG. 3, the bracket 8 is in the form of an approximately L-shaped plate in front view. The bracket 8 includes a first circular bolt bore 8a disposed adjacent one end thereof, and a second circular bolt bore 8b disposed adjacent the other end. As shown in FIG. 4, the bracket 8 further includes a stepped projection 8c formed on a surface thereof adjacent the second bolt bore 8b. As seen from FIG. 4, the stepped projection 8c defines a contact surface at a free end thereof. As shown in FIG. 5, the bicycle frame 50 includes a derailleur mounting extension 14 formed integrally with a rear fork end 51 by casting. The rear derailleur 100 is attached to the bicycle frame 50 through this bracket 8.

Specifically, the first bolt bore 8a is used to connect the bracket member 5 of the rear derailleur 100 to the bracket 8. As shown in FIG. 2, the first bolt bore 8a receives a mounting bolt 15 attached to the bracket member 5 of the derailleur 100. The mounting bolt 15 and bracket member 5 are relatively rotatably connected to each other. Thus, the bracket 8 pivotally supports the bracket member 5 through the mounting bolt 15, whereby the bracket member 5 is connected to the bracket 8 to be pivotable about the first axis 91.

The second bolt bore 8b is used to connect the bracket 8 to the bicycle frame 50. As shown in FIG. 1, a connecting bolt 16 is placed to extend through the second bolt bore 8b and a bolt bore 14a defined in the derailleur mounting extension 14. The connecting bolt 16 is then tightened to rigidly interconnect the bracket 8 and derailleur mounting extension 14.

The projection 8c is used to set the bracket 8 to a predetermined posture relative to the rear fork end 51, thereby to maintain the rear derailleur 100 in a suitable posture relative to the bicycle frame 50.

That is, as shown in FIG. 5, the bracket 8 is tightened and fixed to the rear fork end 51 with the projection 8c of the bracket 8 contacting a contact surface of a stopper 14b formed integrally with the derailleur mounting extension 14 by casting. In this state, the contact surface at the free end of the projection 8c performs positioning action with respect to the stopper 14b, to fix the bracket 8 to a predetermined posture relative to the derailleur mounting extension 14 as shown in FIG. 5. Once the bracket 8 is assembled in the predetermined posture relative to the rear fork end 51, the rear derailleur 100 is assembled to the bicycle frame 50 in a suitable posture, as shown in FIG. 5, because of the shape of the bracket 8 and the positional relationship between bolt bores 8a and 8b.

In this condition, the chain 101 is wound around the guide wheel 1 and tension wheel 2, and engaged with the rear gear G1 having 13 teeth. Where the rear gear assembly does not include a gear having 13 teeth, a supplemental rear gear having 13 teeth is temporarily added for assembled position setting purposes to place the chain 101 in engagement with the guide wheel 1, the tension wheel 2 and the gear having 13 teeth. Where the bicycle frame has a plurality of front gears, the chain 101 is engaged with the largest front gear. Front and rear wheels of the bicycle frame are placed on a level ground, with the chain 101 engaged with the gear G1, guide wheel 1 and tension wheel 2 as noted above. Further, a first phantom line 95 extending through a rotational axis 1a of the guide wheel 1 and a rotational axis 2a of the tension wheel 2 is placed perpendicular to the level ground. In this position, a second phantom line 96 extending parallel to a first pivotal axis 93 about which the outer pivot link 6 is pivotable relative to the bracket member 5, and to a second pivotal axis 94 about which the outer pivot link 6 is pivotable relative to the support member 4, and extending through a hub axis X, is located between the first pivotal axis 93 and second pivotal axis 94 as seen in the direction of the hub axis. Further, as seen in the direction of the hub axis, the rotational axis 1a of the guide wheel 1 is located below a third phantom line 97 extending through the first axis 91 and second axis 92. This position corresponds to the suitable posture noted above. In the suitable posture, the vertical pivotal movement about the first axis 91 of the support member 4 and the vertical pivotal movement about the second axis 92 of the chain guide 3 cause the guide wheel 1 to move vertically relative to the gears G1–G7 and axially of the hub without contacting the gears G1–G7. At this time, the guide wheel 1 moves vertically relative to the gears G1–G7 in an efficient way to a close vicinity of the gears G1–G7. With the movement axially of the hub of the guide wheel 1, a shifting force is efficiently applied to the chain 101.

In a suitable assembly posture of the rear derailleur 100, the rotational axis 1a of the guide wheel 1 may be located on the third phantom line 97. In this case also, when the guide wheel 1 moves relative to the gears G1–G7 with the pivotal movement about the second axis 97 of the chain guide 3 relative to the support member 4, the guide wheel 1 has a long vertical stroke for a pivoting angle of the chain guide 3. The projection 8c of the bracket 8 may be formed, for example, by embossing, to the back of the bracket 8, a portion of the plate forming the bracket 8. A bore 8d formed adjacent the first bolt bore 8a is for receiving one end of the first tension spring 12 to connect the first tension spring 12 to the bracket 8.

The bolt bores 8a and 8b of the bracket 8 may be replaced by devices having various other shapes. For example, the bracket 8 may include cutout holes opening to ends thereof, or connecting bolts secured thereto. Thus, the bolt bores and other devices are collectively called herein first connecting means 8a and second connecting means 8b. The bolt bore 14a of the derailleur mounting extension 14 is called simply connecting means 14a.

A set bolt may be employed in place of the projection 8c. Instead of contacting the stopper 14b, the projection 8c may contact a position of the derailleur mounting extension 14 closer to a distal end thereof than the bolt bore 14a. Thus, these devices are collectively called position setting means 8c.

What is claimed is:

1. A rear derailleur bracket for connecting a rear derailleur to a bicycle frame, said rear derailleur bracket comprising:
    a bracket body;
    first connecting means provided adjacent a first end of said bracket body for connecting said rear derailleur to said bracket body;
    second connecting means provided adjacent a second end of said bracket body for connecting said bracket body to a coupling device formed at a derailleur mounting extension extending from a rear fork end of said bicycle frame; and
    position setting means for contacting said derailleur mounting extension to place said rear derailleur in a predetermined posture relative to said rear fork end;
    wherein said rear derailleur bracket connects said rear derailleur to said bicycle frame such that when said rear derailleur is positioned with a chain wound around a rear gear having 13 teeth, a guide wheel and a tension wheel of said rear derailleur, and with a line extending vertically as seen in a direction along a hub axis through a rotational axis of said guide wheel and a rotational axis of said tension wheel, a line extending parallel to two vertical pivotal axes of said rear derailleur and extending through said hub axis is located between said two vertical pivotal axes of said rear derailleur as seen in the direction along said hub axis, and said rotational axis of said guide wheel is located level with or below a line extending through two horizontal pivotal axes as seen in the direction along said hub axis; and
    wherein said first connecting means and said second connecting means are arranged such that, when said bracket body is attached to said rear fork end, said first connecting means provides a first connection point below and rearwardly of a second connection point provided by said second connecting means with reference to said rear fork end.

2. A rear derailleur bracket as defined in claim 1, wherein said bracket body is formed of an approximately L-shaped plate, with said first connecting means and said second connecting means being in a form of substantially circular bolt bores, and said position setting means disposed adjacent said second connecting means.

3. A rear derailleur bracket as defined in claim 2, wherein said position setting means is in a form of a projection extending from a surface of said plate.

* * * * *